USO10223019B1

(12) United States Patent
Roytman et al.

(10) Patent No.: US 10,223,019 B1
(45) Date of Patent: Mar. 5, 2019

(54) POLICY-DRIVEN VOLUME EXPANSION

(71) Applicant: EMC Corporation, Hopkinton, MA (US)

(72) Inventors: Evgeny Roytman, Sharon, MA (US); Anoop George Ninan, Milford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/474,927

(22) Filed: Sep. 2, 2014

(51) Int. Cl.
*G06F 3/06* (2006.01)

(52) U.S. Cl.
CPC .......... *G06F 3/0638* (2013.01); *G06F 3/0604* (2013.01); *G06F 3/0689* (2013.01); *G06F 2003/0695* (2013.01)

(58) Field of Classification Search
CPC .... G06F 3/0604; G06F 3/0638; G06F 3/0689; G06F 2003/0695
USPC .................................................. 711/170, 171
See application file for complete search history.

(56) References Cited

U.S. PATENT DOCUMENTS

| 2004/0186924 | A1* | 9/2004 | Uchida | G06F 3/0613 710/5 |
| 2014/0089581 | A1* | 3/2014 | DeNeui | G06F 3/0607 711/114 |
| 2015/0134903 | A1* | 5/2015 | Goodman | G06F 3/0689 711/114 |
| 2016/0004481 | A1* | 1/2016 | Lakshman | G06F 3/0689 711/114 |

* cited by examiner

*Primary Examiner* — Gary J Portka
(74) *Attorney, Agent, or Firm* — Krishnendu Gupta; Deepika Bhayana; Anne-Marie Dinius (57) ABSTRACT

A computer program product, system, and computer-executable method for managing meta volumes in a data storage system, the computer program product, system, and computer-executable method comprising receiving one or more data storage characteristics, analyzing the one or more data storage characteristics, based on the analyzing, creating a policy responsive to the data storage characteristics, and allocating a meta volume based on the policy.

15 Claims, 11 Drawing Sheets

POLICY-DRIVEN VOLUME EXPANSION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A computer program product, system, and computer-executable method for managing meta volumes in a data storage system, the computer program product, system, and computer-executable method comprising receiving one or more data storage characteristics, analyzing the one or more data storage characteristics, based on the analyzing, creating a policy responsive to the data storage characteristics, and allocating a meta volume based on the policy.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Traditionally, data storage systems employ data storage arrays to provide data storage to compute nodes executing applications. Generally, data storage arrays provide data storage using one or more data volumes. Conventionally, data storage arrays are enabled to provide data volumes up to a maximum size. Typically, in order to provide data storage of a size larger than a maximum size of a data volume, data volumes are combined. Generally, enabling a data storage system to intelligently combine data volumes would be beneficial to the performance of a data storage system.

In many embodiments, the current disclosure may enable a distributed software control platform that allows enterprise IT departments and cloud service providers to convert the heterogeneous storage systems within a data center into one large storage array. In some embodiments, the current disclosure may enable exposure of logical storage resources and allow enterprise IT departments and cloud service providers to manage heterogeneous storage environments through a simple, robust Representational State Transfer (REST) API and a command-line interface (CLI). In at least one embodiment, one API and one CLI may be used to connect to all the storage arrays in a data center as if they were one large storage array.

In some embodiments, the current disclosure may enable a software platform for multi-tenant environments that delivers a single logical, cloud-scale, geo-distributed storage system for developers and storage/cloud administrators. In certain embodiments, the current disclosure may enable an enterprise to adopt hybrid management models in environments where storage infrastructure resides in enterprise data centers, but is also hosted by a service provider or a public cloud. In certain embodiments, the current disclosure may enable an enterprise to manage hybrid deployments as a single storage array. In further embodiments, the current disclosure may enable a data storage system to scale to millions of storage volumes and file shares. In still further embodiments, the techniques and implementations described herein may be deployed as a vApp, a set of virtual machines.

In certain embodiments, the current disclosure may enable data-centric cloud infrastructures to be managed efficiently and flexibly through a data management software platform. In some embodiments, the current disclosure may simplify the management of complex, heterogeneous, geo-distributed storage resources by exposing the storage systems as logical resources through robust, easy-to-use REST API and CLI interfaces. In most embodiments, the current disclosure may provide integrations into cloud stacks such as VMware® and OpenStack™.

In certain embodiments, the following definitions may be useful:

A data service may be a service for receiving, processing, storing, and protecting data. In certain embodiments, data services provide the high-level data and storage management capabilities of the system.

A control path may be a way to establish and control access to the data.

A data path may be the path the data takes from data storage provider to data storage consumer.

A storage medium may be any medium that is capable of storing data, including, but not limited to a storage array, a storage cluster, a physical disk, a virtual disk, and a virtual storage system.

A tenant may represent an organization operating within a data storage system. In some embodiments, a tenant may be created in the system for the purposes of security isolation.

An active-active data storage system may have a storage medium exposed in two locations enabling data consistency in both locations. In many embodiments, the storage medium may be accessible from both locations.

An active-passive data storage system may have an active storage medium and a passive storage medium where the passive storage medium mirrors the active storage medium. In some embodiments, if the active storage medium fails, the passive storage medium may become active.

A project may be a resource organization abstraction that maps resources to applications, virtual data centers, departments, or other entities. In some embodiments, a user may create their own projects, and may associate multiple resources from different data services with the projects. In most embodiments, resources from one project maybe shared between users under the same tenant.

A Class of Service may represent high-level capabilities and services that are created by users through composition of resource attributes and quality of services, including level of protection, availability, access protocol, performance, and additional storage/data services, such as versioning/snap, backup, remote replication, data reduction, encryption, etc.

A data volume may be an amount of data storage that a data storage system may be enabled to provide using one or more data storage arrays. In various embodiments, a data volume may be a portion of the total amount of data storage that a data storage system may be enabled to provide.

A meta volume may be two or more data volumes that may be combined and provided through a data storage system. In most embodiments, a meta volume may appear as a single volume to one or more applications and/or compute nodes utilizing the meta volume. In certain embodiments, one or more class of services may be applied to one or more meta volumes in a data storage system.

Generally, a data storage array or system may be one or more physical boxes or a cluster of physical boxes. In conventional systems, the data storage array or system may have one control path and data paths. In typical systems, one or more data paths ports may provide data path access to the storage resources contained within the storage system. Typically, the protocols for the data path ports may be fiber channel, Internet Protocol (IP), iSCSI, NFS, or CIFS. Usually, to add more capacity to a data storage array or system, more physical disks, more inline cards, or more CPUs may be added to the data storage array or system. Conventionally, the data storage system or array may be a cluster of storage mediums. Typically, providing management for large numbers of data storage arrays or systems may be challenging.

Figure 1:
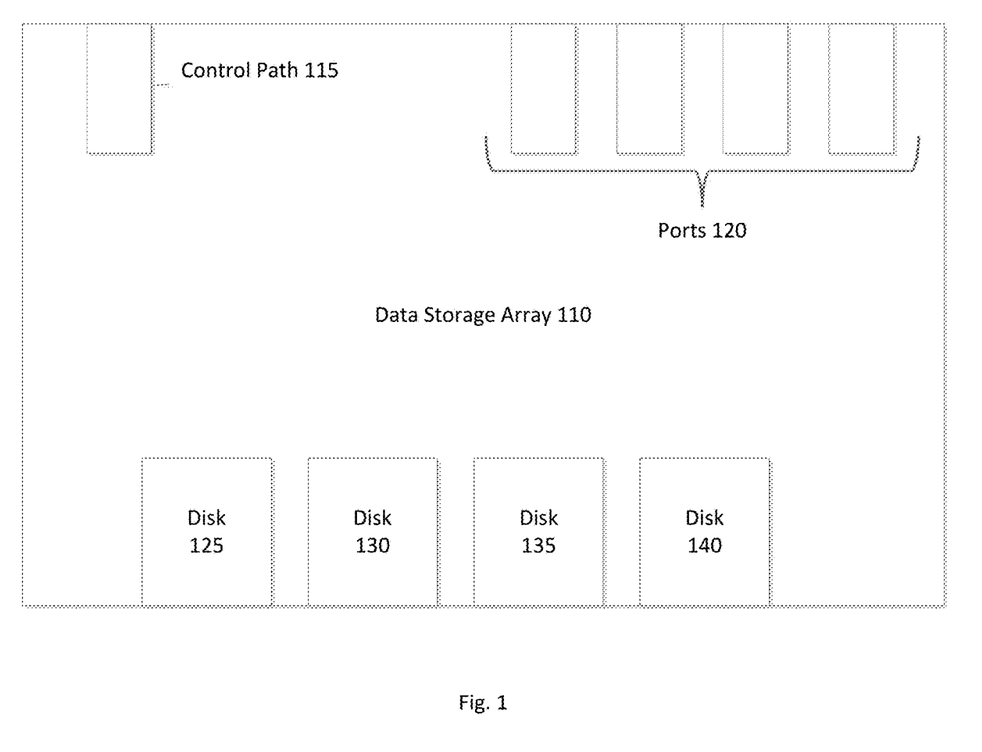
FIG. 1 illustrates a sample data storage array, in accordance with an embodiment of the present disclosure.

Refer to the example embodiment of FIG. 1. FIG. 1 illustrates a sample data storage array, in accordance with an embodiment of the present disclosure. Data storage array 110 has control path 115, ports 120, and disks 125, 130, 135, and 140. Control path 115 enables a user to interface with data storage array 110. Control path 115 enables user to access disks 125, 130, 135, and 140, via the services data storage array 110 offers, through one or more ports 120. In many embodiments, a data storage system may utilize and/or manage one or more data storage arrays to provide data storage services to one or more compute nodes executing one or more applications.

In many embodiments, the current disclosure may enable a data storage system to implement automated policy-driven data volume expansion. In various embodiments, the current disclosure may enable a data storage system to analyze user, administrator, and/or application input to create a data volume policy that matches requested data storage characteristics. In certain embodiments, data storage characteristics may correspond to one or more classes of service that a data storage system may be enabled to provide. In other embodiments, data storage characteristics may correspond to one or more data services provided by one or more data volumes and/or meta volumes in a data storage system. In most embodiments, the current disclosure may change how a meta volume may be implemented based on a user and/or administrator's requested data storage characteristics. In many embodiments, augmenting a data storage system's volume-expansion process to reflect a user's requested data storage characteristics may enable a data storage system to provide faster expanding data storage volumes and/or faster I/O performance. In various embodiments, the current disclosure may enable a data storage system to simplify an input interface to enable users to obtain the desired performance from a data storage system.

In many embodiments, the current disclosure may enable a data storage system to use one or more techniques to create and/or expand a meta volume. In various embodiments, the current disclosure may enable a data storage system to create a concatenated meta volume. In most embodiments, a concatenated meta volume may be comprised of two or more data storage volumes that may act as a single data volume. In other embodiments, a concatenated meta volume may be quickly expanded by adding one or more data storage volumes to the concatenated meta volume. In many embodiments, expansion of a concatenated meta volume may be completed without moving and/or modifying data already stored on the concatenated meta volume.

In various embodiments, the current disclosure may enable a data storage system to create a striped meta-volume. In certain embodiments, a striped meta-volume may include two or more data volumes where data stored on the striped meta-volume may be distributed among the two or more data volumes. In some embodiments, implementation of a striped meta-volume may enable an increase of I/O performance. In most embodiments, in order to expand a striped meta-volume, data stored on the striped meta-volume may be moved to secondary storage while one or more data storage volumes may be added to the striped meta-volume. In various embodiments, data temporarily moved to secondary storage may be again striped on the newly expanded striped meta volume.

In many embodiments, based on received inputs, a data storage system may be enabled to create a policy to automate data volume expansion. In various embodiments, a data storage system prioritizing how quickly a volume may be enabled to expand to reflect additional required capacity may create a policy that may favor concatenated meta volumes. In some embodiments, a data storage system prioritizing the performance of a meta volume may create a policy that may favor striped meta volumes. In most embodiments, a data storage system may be enabled to determine a best type of data volume expansion for one or more users based on received inputs.

In many embodiments, a user may request that a data storage system create a large volume. In various embodiments, creating a large data storage volume may require use of a meta volume. In certain embodiments, a user may specify one or more data services, such as, but not limited to, fast expansion and/or fast I/O processing. In some embodiments, when a user chooses fast expansion, a data storage system may create a volume expansion policy that utilizes concatenation to create and/or expand meta-volumes. In other embodiments, when a user chooses fast I/O processing, a data storage system may create a volume expansion policy that utilizes striping to create and/or expand meta volumes.

In most embodiments, a data storage system may be enabled to manage failure of a data volume expansion and/or creation. In various embodiments, if a data volume is being expanded and/or created, a data storage system may be enabled to detect whether one or more failures has occurred. In certain embodiments, once a failure has occurred, a data storage system may be enabled to rollback one or more executed steps to place the data storage system in a previous state.

In many embodiments, if a volume creation and/or expansion operation fails, a data storage system may be enabled to use rollback automation to place the data storage system in a state prior to the initiation of the volume creation and/or expansion operation that failed. In various embodiments, a data storage system may be enabled to delete data volume creation and/or expansion requests that may be incomplete. In certain embodiments, incomplete data volume creation and/or expansion request may occur due to loss of communication and/or other hardware failures.

In some embodiments, a data storage system may receive a duplicate delete volume request which may indicate that a communication failure may have occurred. In most embodiments, a duplicate delete volume request may cause the data storage system to re-initiate a delete volume operation. In some embodiments, a data storage system may attempt to determine what circumstances caused a duplicate delete volume request. In other embodiments, once a duplicate delete volume request is received, a data storage system may wait until the data storage system maintains a steady state and re-initiate the delete volume operation. In most embodiments, a steady state of a data storage system may include a state where the data storage system may be in communication and/or resumed communication with each data storage array.

Figure 2:
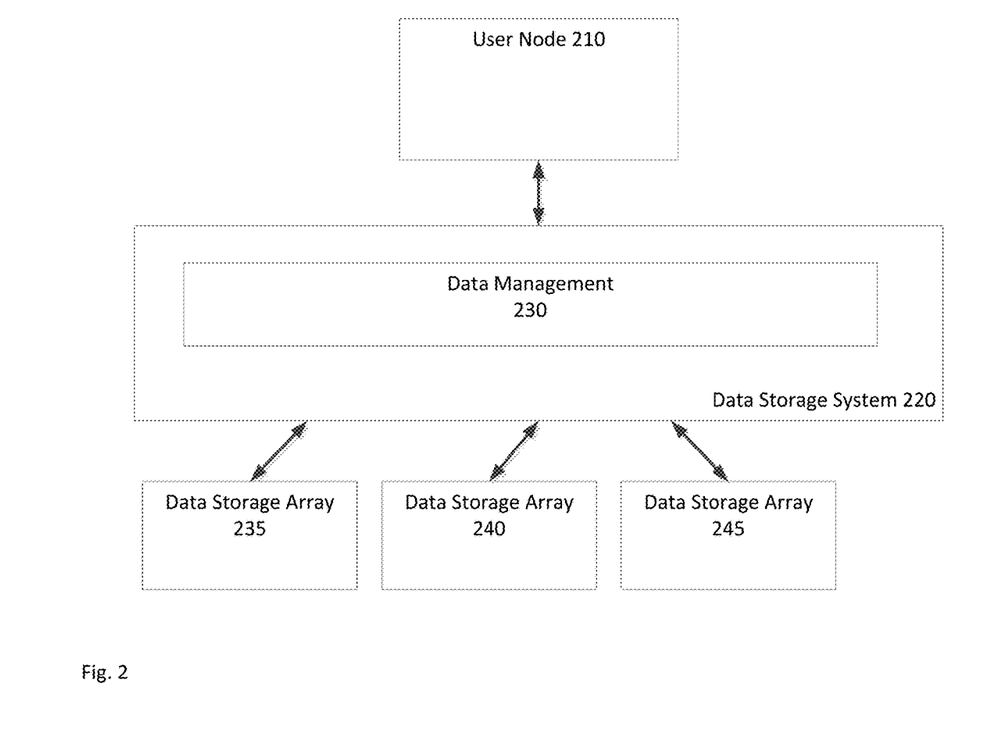
FIG. 2 is a simplified illustration of a node in communication with a data storage system, in accordance with an embodiment of the present disclosure.

Refer to the example embodiment of FIG. 2. FIG. 2 is a simplified illustration of a node in communication with a data storage system, in accordance with an embodiment of the present disclosure. Data storage system 220 includes data management module 230. Data storage system 220 is enabled to communicate with data storage arrays 235, 240, 245 and user node 210. Data storage system 220 is enabled to provide data storage from data storage arrays 235, 240, 245 to user node 210 using data management module 230.

Figure 3:
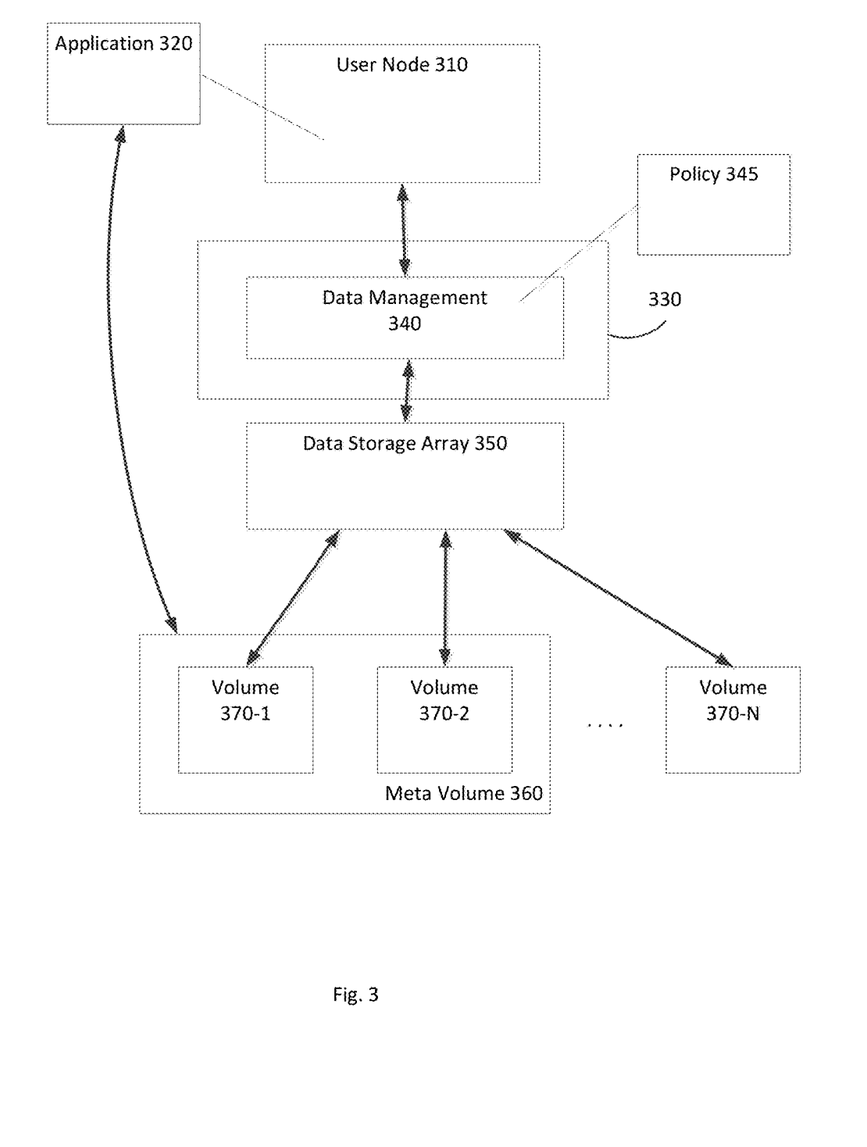
FIG. 3 is a simplified illustration of a data storage system providing a meta volume to a compute node, in accordance with an embodiment of the present disclosure.

Refer to the example embodiment of FIG. 3. FIG. 3 is a simplified illustration of a data storage system providing a meta volume to a compute node, in accordance with an embodiment of the present disclosure. As shown, data storage system 330 includes data management module 340. Data management module 330 is enabled to communicate with user node 310 and data storage array 350. Data storage array 350 is enabled to manage data volumes (370-1 . . . N, 370 Generally). In most embodiments, a data storage system may be enabled to communicate with one or more data storage arrays to provide data storage to one or more compute nodes. In FIG. 3, user node 310 is executing application 320 and is enabled to request data storage from data storage system 330. User node 310 is enabled to communicate with data management module 340 in data storage system 330 to request allocation of data storage for application 320. Data management module 340 is enabled to manage requests to allocate data storage from data storage system 330. Data management module 340 is enabled to create policy 345 to manage data expansion of one or more data volumes for user node 310. Data management module 340 is enabled to direct data storage array 350 to allocate meta volume 360 for application 320 on user node 310. In this embodiment, meta volume 360 is a combination of volume 370-1 and volume 370-2. Data storage system 330 is enabled to expand, or shrink, meta volume 360 based usage by application 320 and policy 345.

In many embodiments, a user node may request one or more different types of data services. In some embodiments, the one or more different types of data services may be a part of one or more classes of services. In various embodiments, a data service may include faster volume expansion. In other embodiments, a data service may include faster I/O performance. In most embodiments, a data storage system may be enabled to create a policy to manage data volume expansion based on received requests for one or more data services. In certain embodiments, the data storage system may be enabled to detect failures during meta volume allocation and/or expansion activities. In some embodiments, if a failure is detected, a data storage system may be enabled to rollback and/or revert data storage allocation to a previous state. In most embodiments, a previous state may include a state prior to when commands were executed to start an allocation data storage from the data storage system.

Figure 4:
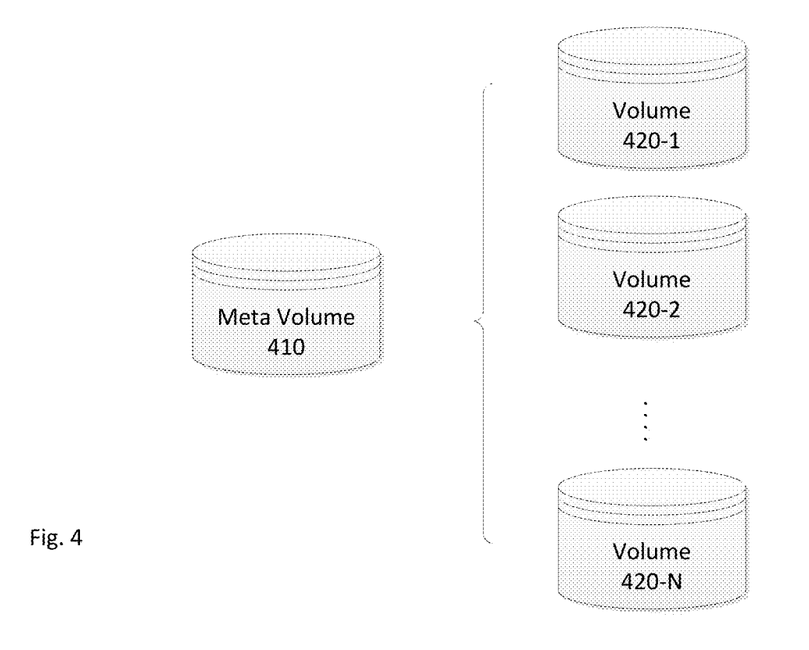
FIG. 4 is a simplified illustration of a meta volume allocated from one or more data storage arrays, in accordance with an embodiment of the present disclosure.

Refer to the example embodiment of FIG. 4. FIG. 4 is a simplified illustration of a meta volume allocated from one or more data storage arrays, in accordance with an embodiment of the present disclosure. As shown, meta volume 410 is enabled to include data volumes (420-1 . . . N, 420 Generally). In most embodiments, a meta volume may be enabled to include more data volumes as more data storage is requested from a data storage system.

Figure 5:
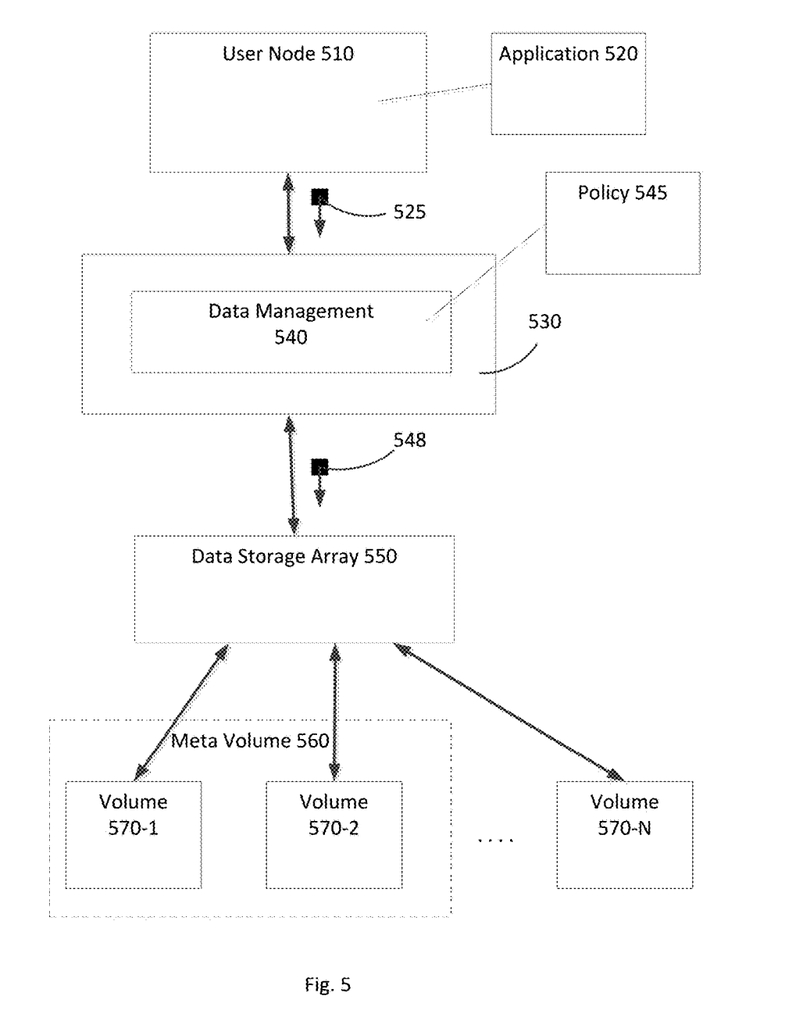
FIG. 5 is a simplified illustration of a data storage system allocating a meta volume, in accordance with an embodiment of the present disclosure.

Refer to the example embodiment of FIG. 5. FIG. 5 is a simplified illustration of a data storage system allocating a meta volume, in accordance with an embodiment of the present disclosure. As shown, data storage system 530 is enabled to communicate with user node 510 and data storage array 550. User node 510 is enabled to execute application 520. Data storage system 530 includes data management module 540, which is enabled to direct data storage array 550 to allocate one or more data volumes and/or one or more meta volumes for user node 510. Data storage array 550 is enabled to create and/or manage data volumes (570-1 . . . N, 570 Generally).

Figure 6:
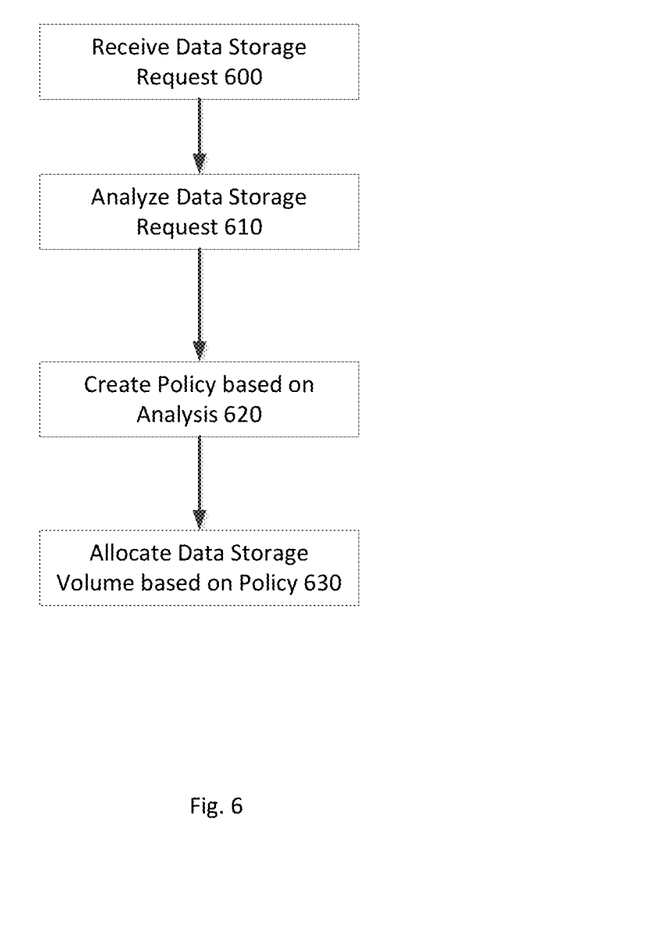
FIG. 6 is a simplified flowchart of a method of managing data volume expansion as shown in FIG. 5, in accordance with an embodiment with the present disclosure.

Refer to the example embodiment of FIGS. 5 and 6. FIG. 6 is a simplified flowchart of a method of managing data volume expansion as shown in FIG. 5, in accordance with an embodiment with the present disclosure. As shown, data storage system 530 is in communication with user node 510 and data storage array 550. Application 520 is executing on user node 510. User node 510 requests data storage from data storage system 530 using message 525 for application 520. Data storage system 530 receives data storage request (Step 600) and directs message 525 to data management module 540. Data management module 540 analyzes data storage request (Step 610) and creates policy 545 to manage allocation and/or management of meta volume expansion in data storage system 530 (Step 620). Data management module 540 directs data storage array 550 to allocate meta volume 560 (Step 630) using message 548.

Figure 7:
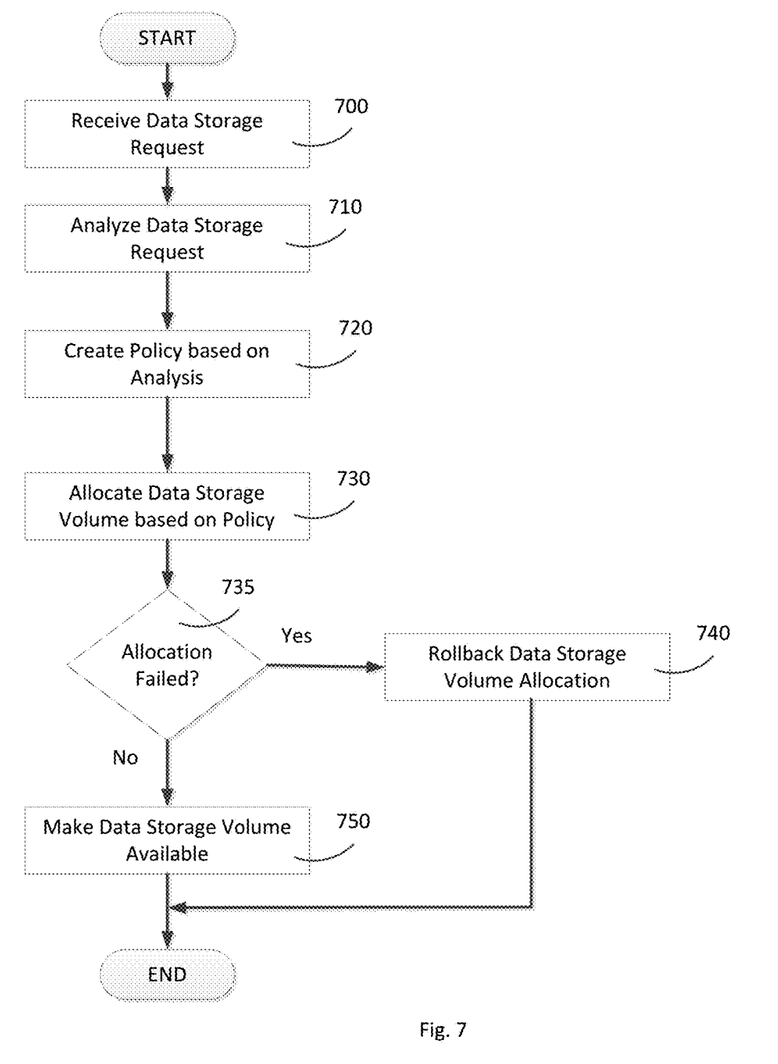
FIG. 7 is a simplified flowchart of error management during volume expansion as shown in FIG. 5, in accordance with an embodiment of the present disclosure.

Refer to the example embodiment of FIGS. 5 and 7. FIG. 7 is a simplified flowchart of error management during volume expansion as shown in FIG. 5, in accordance with an embodiment of the present disclosure. As shown, data storage system 530 is in communication with user node 510 and data storage array 550. Data storage system 530 receives data storage request from user node 510 in message 525 (Step 700). Data management module 540 analyzes message 525 (Step 710) to create a policy for data volume expansion (Step 720). Data management module 540 directs data storage array 550 to allocate meta volume 560 based on policy 545 (Step 730). Data management module 540 queries data storage array 550 to determine whether allocation of meta volume 560 failed (Step 735). If one or more steps during allocation of meta volume 560 failed, data manage module 540 rolls back each step executed while allocating meta volume 560 and reverts data storage array 550 to a previous state (Step 740). If allocation of meta volume 560 succeeded, data management module 540 makes meta volume 560 available to application 520 (Step 750).

Figure 8:
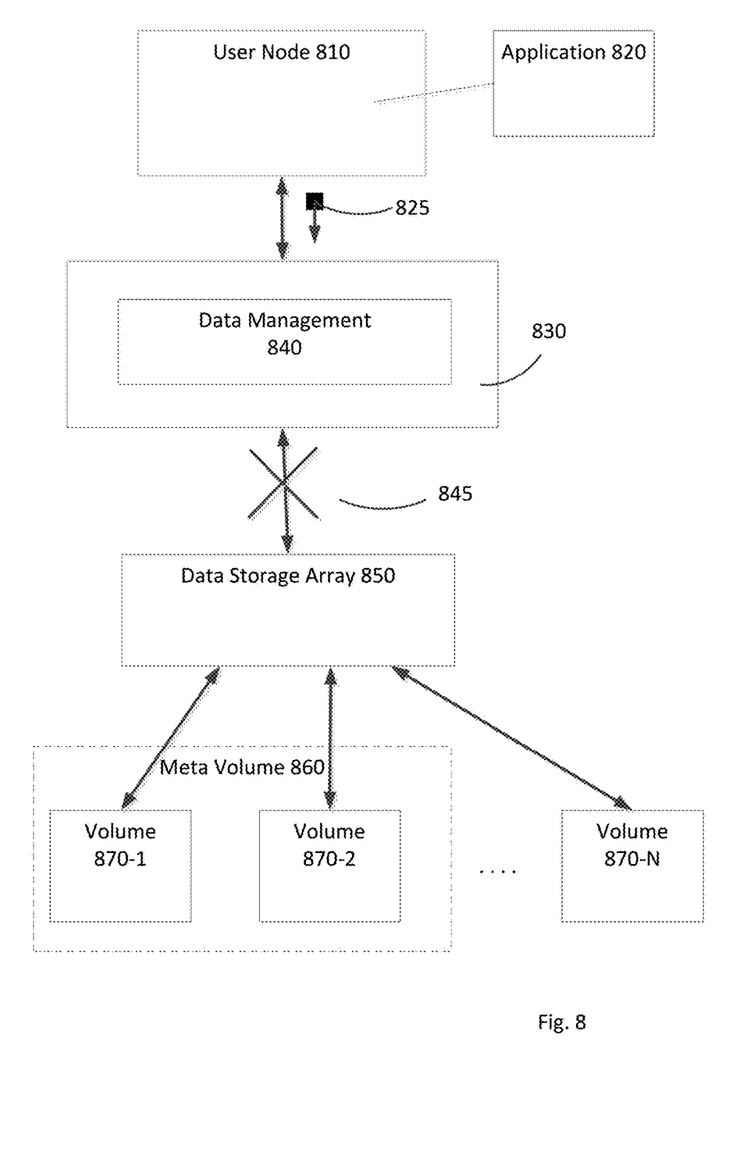
FIG. 8 is a simplified illustration of a data storage system managing a communication failure, in accordance with an embodiment of the present disclosure.

Refer to the example embodiment of FIG. 8. FIG. 8 is a simplified illustration of a data storage system managing a communication failure, in accordance with an embodiment of the present disclosure. As shown, data storage system 830 is in communication with user node 810. Data storage system 830 includes data management module 840. Communication between data storage system 830 is interrupted by disruption 845. Data storage array 850 is enabled to create and/or manage data volumes (870-1 . . . N, 870 Generally).

Figure 9:
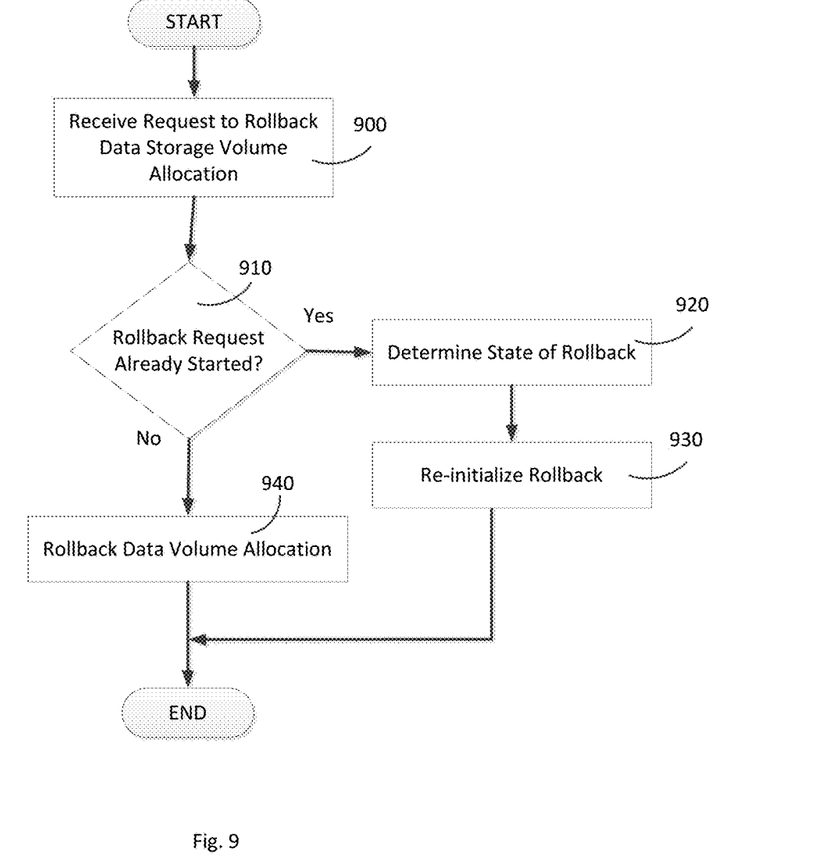
FIG. 9 is a simplified flowchart of a method of managing a communication interruption during a volume expansion as shown in FIG. 8, in accordance with an embodiment of the present disclosure.

Refer to the example embodiments of FIGS. 8 and 9. FIG. 9 is a simplified flowchart of a method of managing a communication interruption during a volume expansion as shown in FIG. 8, in accordance with an embodiment of the present disclosure. Data storage system 830 receives request to rollback meta volume 860 (Step 900) in message 825. Data management module 840 determines whether a rollback has already been completed (Step 910). If rollback has been started, data management module 840 determines the state of the rollback (Step 920) and completes the rollback once communication is re-established between data storage system 830 and data storage array 850 (Step 930). If a rollback has not been started, data management module 840 initiates a rollback of meta volume 860 (Step 940) and places data storage system 830 in a previous state.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 10:
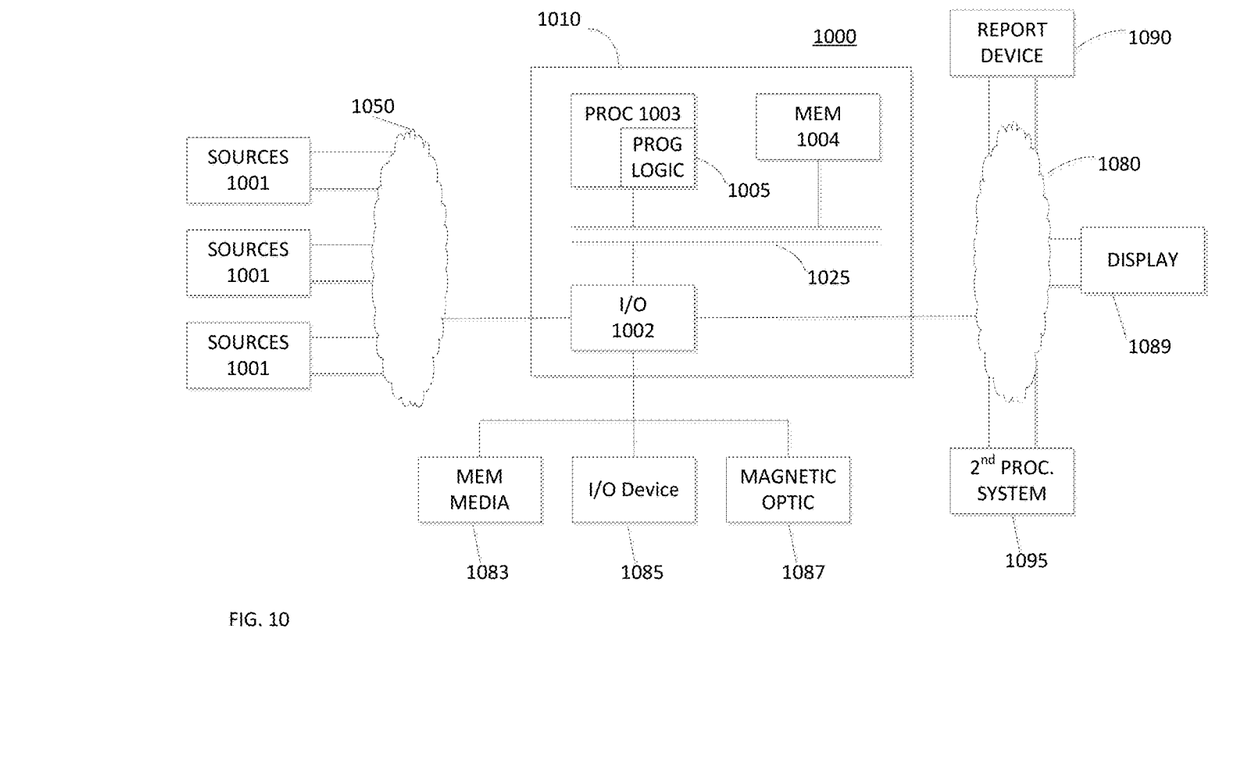
FIG. 10 is an example of an embodiment of an apparatus that may utilize the techniques described herein, in accordance with an embodiment of the present disclosure.

FIG. 10 is a block diagram illustrating an apparatus, such as a computer 1010 in a network 1000, which may utilize the techniques described herein according to an example embodiment of the present invention. The computer 1010 may include one or more I/O ports 1002, a processor 1003, and memory 1004, all of which may be connected by an interconnect 1025, such as a bus. Processor 1003 may include program logic 1005. The I/O port 1002 may provide connectivity to memory media 1083, I/O devices 1085, and drives 1087, such as magnetic or optical drives. When the program code is loaded into memory 1004 and executed by the computer 1010, the machine becomes an apparatus for practicing the invention. When implemented on one or more general-purpose processors 1003, the program code combines with such a processor to provide a unique apparatus that operates analogously to specific logic circuits. As such, a general purpose digital machine can be transformed into a special purpose digital machine.

Figure 11:
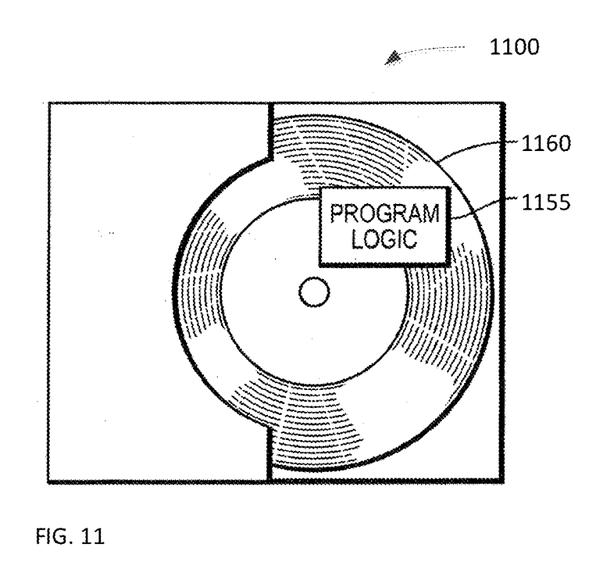
FIG. 11 is an example of a method embodied on a computer readable storage medium that may utilize the techniques described herein, in accordance with an embodiment of the present disclosure.

FIG. 11 is a block diagram illustrating a method embodied on a computer readable storage medium 1160 that may utilize the techniques described herein according to an example embodiment of the present invention. FIG. 11 shows Program Logic 1155 embodied on a computer-readable medium 1160 as shown, and wherein the Logic is encoded in computer-executable code configured for carrying out the methods of this invention and thereby forming a Computer Program Product 1100. Program Logic 1155 may be the same logic 1005 on memory 1004 loaded on processor 1003 in FIG. 10. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-11. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of managing meta volumes in a data storage system in response to a user-specified one or more characteristics, the computer-executable method comprising:

receiving information from the user related to the one or more user-specified desired characteristics of the data storage system, wherein the one or more user-specified characteristics relates to either input/output (I/O) speed or volume expansion;

analyzing the one or more user-specified characteristics;

based on the analyzing, creating a policy responsive to the one or more user-specified characteristics;

saving a first state of the data storage system;

allocating a meta volume based on the policy, wherein the meta volume is a combination of two or more data storage volumes;

wherein the meta volume is enabled to use the policy to expand in either a concatenated fashion; and wherein the data storage system is enabled to rollback changes to the meta volume to the first state if one or more errors are encountered.

2. The computer-executable method of claim 1, further comprising:

determining whether the allocating was successful; and upon a positive determination, providing the meta volume to the data storage system.

3. The computer-executable method of claim 2, further comprising:

upon a negative determination, executing a rollback of the meta volume.

4. The computer-executable method of claim 1, wherein the allocating comprises:

wherein the policy prioritizes I/O speed;

creating a striped meta volume from a first volume of the data storage system and a second volume of the data storage system, wherein the striped meta volume is enabled to be comprised of two or more data storage volumes; and providing the striped meta volume to the data storage system.

5. The computer-executable method of claim 1, wherein the allocating comprises:

wherein the policy prioritizes expandability;

creating a concatenated meta volume from a first volume of the data storage system and a second volume of the data storage system, wherein the concatenated meta volume is enabled to be comprised of two or more data storage volumes; and providing the concatenated meta volume to the data storage system.

6. A system, comprising:

a data storage system in communication with a compute node and a data storage array; and computer-executable program logic encoded in memory of one or more computers in communication with the data storage system to enable management of meta volumes in response to a user-specified one or more characteristics in the data storage system, wherein the computer-executable program logic is configured for the execution of:

receiving information from the user related to the one or more user-specified characteristics of the data storage system, wherein the one or more user-specified characteristics relates to either input/output (I/O) speed or volume expansion;

analyzing the one or more user specified characteristics;

based on the analyzing, creating a policy responsive to the one or more user-specified characteristics;

saving a first state of the data storage system;

allocating a meta volume based on the policy, wherein the meta volume is a combination of two or more data storage volumes;

wherein the meta volume is enabled to use the policy to expand in either a concatenated fashion or a striped fashion; and wherein the data storage system is enabled to rollback changes to the meta volume to the first state if one or more errors are encountered.

7. The system of claim 6, wherein the computer-executable program logic is further configured for the execution of:

determining whether the allocating was successful; and upon a positive determination, providing the meta volume to the data storage system.

8. The system of claim 7, wherein the computer-executable program logic is further configured for the execution of:

upon a negative determination, executing a rollback of the meta volume.

9. The system of claim 6, wherein the allocating comprises:

wherein the policy prioritizes I/O speed;

creating a striped meta volume from a first volume of the data storage system and a second volume of the data storage system, wherein the striped meta volume is enabled to be comprised of two or more data storage volumes; and providing the striped meta volume to the data storage system.

10. The system of claim 6, wherein the allocating comprises:

wherein the policy prioritizes expandability;

creating a concatenated meta volume from a first volume of the data storage system and a second volume of the data storage system, wherein the concatenated meta volume is enabled to be comprised of two or more data storage volumes; and providing the concatenated meta volume to the data storage system.

11. A computer program product for managing in response to a user-specified one or more characteristics meta volumes in a data storage system, the computer-executable method comprising:

a non-transitory computer readable medium encoded with computer-executable program code for using read signatures in replication, the code configured to enable the execution of:

receiving information from the user related to the one or more user-specified characteristics of the data storage system, wherein the one or more user-specified characteristics relates to either input/output (I/O) speed or volume expansion;

analyzing the user-specified one or more characteristics;

based on the analyzing, creating a policy responsive to the one or more user-specified characteristics;

saving a first state of the data storage system;

allocating a meta volume based on the policy, wherein the meta volume is a combination of two or more data storage volumes;

wherein the meta volume is enabled to use the policy to expand in either a concatenated fashion or a striped fashion; and wherein the data storage system is enabled to rollback changes to the meta volume to the first state if one or more errors are encountered.

12. The computer program product of claim 11, wherein the code is further configured to enable the execution of:

determining whether the allocating was successful; and upon a positive determination, providing the meta volume to the data storage system.

13. The computer program product of claim 12, wherein the code is further configured to enable the execution of:
   upon a negative determination, executing a rollback of the meta volume.

14. The computer program product of claim 11, wherein the allocating comprises:
   wherein the policy prioritizes I/O speed;
   creating a striped meta volume from a first volume of the data storage system and a second volume of the data storage system, wherein the striped meta volume is enabled to be comprised of two or more data storage volumes; and
   providing the striped meta volume to the data storage system.

15. The computer program product of claim 11, wherein the allocating comprises:
   wherein the policy prioritizes expandability;
   creating a concatenated meta volume from a first volume of the data storage system and a second volume of the data storage system, wherein the concatenated meta volume is enabled to be comprised of two or more data storage volumes; and
   providing the concatenated meta volume to the data storage system.

* * * * *